(12) United States Patent
Hering et al.

(10) Patent No.: US 11,192,478 B2
(45) Date of Patent: Dec. 7, 2021

(54) DEVICE AND METHOD FOR PRODUCING AN EDGE STRIP FOR A SEAT COVER

(71) Applicant: ADIENT ENGINEERING AND IP GMBH, Burscheid (DE)

(72) Inventors: Michelle Hering, Dortmund (DE); Andreas Schmitz, Burscheid (DE); Lars Hennig, Leichlingen (DE)

(73) Assignee: Adient Engineering and IP GmbH, Burschied (DE)

( * ) Notice: Subject to any disclaimer, the term of this patent is extended or adjusted under 35 U.S.C. 154(b) by 0 days.

(21) Appl. No.: 16/967,347

(22) PCT Filed: Feb. 4, 2019

(86) PCT No.: PCT/EP2019/052644
§ 371 (c)(1),
(2) Date: Aug. 4, 2020

(87) PCT Pub. No.: WO2019/149934
PCT Pub. Date: Aug. 8, 2019

(65) Prior Publication Data
US 2021/0031658 A1 Feb. 4, 2021

(30) Foreign Application Priority Data

Feb. 5, 2018 (DE) ...................... 10 2018 201 755.7

(51) Int. Cl.
*B60N 2/58* (2006.01)
*B68G 7/10* (2006.01)
*B68G 15/00* (2006.01)

(52) U.S. Cl.
CPC ......... *B60N 2/5891* (2013.01); *B60N 2/5883* (2013.01); *B68G 7/105* (2013.01); *B68G 15/005* (2013.01)

(58) Field of Classification Search
CPC .... B60N 2/5891; B60N 2/5883; B68G 7/105; B68G 15/005
See application file for complete search history.

(56) References Cited

U.S. PATENT DOCUMENTS

| 2,028,494 A | 1/1936 | Blanchet et al. |
| 2,290,007 A * | 7/1942 | Valentine ............. D05B 15/005 |
| | | 112/417 |

(Continued)

FOREIGN PATENT DOCUMENTS

| DE | 3422769 | 1/1986 |
| FR | 2155743 | 4/1973 |
| GB | 150098 | 12/1919 |

OTHER PUBLICATIONS

PCT International Search Report and Written Opinion (PCT/EP2019/052644).

(Continued)

*Primary Examiner* — Ryan J. Walters
(74) *Attorney, Agent, or Firm* — Marshall & Melhorn, LLC (57) ABSTRACT

A device for producing an edge strip may have a supply unit with at least two openings for separately supplying an edge strip core and a material strip of a casing for the edge strip core. The material strip may be provided with a decorative element, an adapter unit, and a processing unit. The supply unit arranges the edge strip core on a surface side of the material strip which forms the inner face of the casing, and the adapter unit is designed to fold the material strip around the edge strip core. Free ends of the casing protrude from the edge strip core and lie one over the other, and the processing unit connects the free ends lying one over the other together. A method for producing an edge strip using such a device and to a seat cover with an edge strip is also included.

7 Claims, 8 Drawing Sheets

(56) References Cited

U.S. PATENT DOCUMENTS

| | | | | |
|---|---|---|---|---|
| 4,095,543 A * | 6/1978 | Gassman | ............... | B68G 7/105 |
| | | | | 112/417 |
| 4,722,289 A * | 2/1988 | Ohsawa | ............... | D05B 35/062 |
| | | | | 112/137 |
| 2002/0152939 A1 * | 10/2002 | Ashton | .................. | D05B 31/00 |
| | | | | 112/441 |
| 2004/0154511 A1 * | 8/2004 | Takei | ...................... | D05B 93/00 |
| | | | | 112/475.17 |
| 2015/0375654 A1 | 12/2015 | Lemarchand et al. | | |
| 2021/0023971 A1 * | 1/2021 | Hering | ................. | B60N 2/5891 |

OTHER PUBLICATIONS

Nahtechnik & Produktionszubehor Zieger; YouTube video published May 26, 2015; pp. 1-2 (retrieved Feb. 21, 2019).

\* cited by examiner

DEVICE AND METHOD FOR PRODUCING AN EDGE STRIP FOR A SEAT COVER

The invention relates to a device for producing an edge strip, in particular for a seat cover, to a method for producing the edge strip by means of the device, and to a seat cover for a seat, in particular a vehicle seat.

A seat, such as, for example, a vehicle seat, is conventionally provided with a seat cover. Furthermore, it is known to provide the seat cover with a decorative seam or decorative stitching or with an edge strip. An edge strip is understood as meaning in particular an edge reinforcement between two cover parts, for example for a seat, a head restraint, a foot mat, a vehicle headlining, a strut, a sun visor, a glove compartment or the like. The edge strip serves here both for edge reinforcement and as a decorative element. For example, the edge strip serves to emphasize contours or as a design element.

It is an object of the present invention to specify a novel device and a novel method for producing an edge strip, in particular for a seat cover. Furthermore, it is an object of the invention to specify an improved seat cover having an edge strip produced by means of the device and the method. In particular, an edge strip can be produced in a simple manner by means of the device according to the invention.

With regard to the device for producing an edge strip, the object is achieved according to the invention by the features specified in the claims.

The edge strip is provided in particular for a seat cover for visual enhancement. The edge strip comprises an edge strip core, which is surrounded by a casing, and an edge strip tab, wherein free ends of the casing form the edge strip tab, and wherein the casing is provided on the outer side with a decorative element. The edge strip core is arranged in the casing, wherein the free ends are connected to one another, in particular sewn, along the extent of the edge strip.

The edge strip core here can be in the form of a cord or an elongate hollow part or profiled part. For example, the edge strip core can be arranged loosely in the casing. In an alternative embodiment, the casing may also be formed "without a core" (without a shaped part or cord or tube), wherein the casing is folded in such a manner that a cavity is formed along the longitudinal extent, the cavity forming a hollow edge strip center.

The advantages achieved with the device according to the invention consist in particular in that an edge strip formed in this way with an edge strip core or a hollow edge strip center can be produced in a simple manner, wherein the core reinforces the seam of two cover parts, wherein an additional visual effect is made possible by means of the design element or decorative element. The casing of the edge strip serves here for fastening the edge strip, for example, to a seat part, an upholstered part, a sun visor or to another similar part.

The edge strip core (also called bead, center or core) is encased or surrounded by the casing. The edge strip core can be arranged loosely in the casing. The edge strip core can optionally be fastened to the casing, in particular to the material strip thereof, by means of an integral bond. For example, the material strip can additionally be formed in a self-bonding manner on the inner side. In particular, an adhesive coating can be applied to an inner side of the casing, said inner side facing the edge strip core, or to the material strip of said casing.

In one possible embodiment, free ends of the casing form the edge strip tab, said free ends being connected, for example adhesively bonded and/or stitched, to one another.

In other words: the material strip surrounds the edge strip core and is sewn at its free ends, and therefore at the free ends of the casing, forming an edge strip tab. The free ends are connected to one another here in the region which is adjacent to the edge strip core. The edge strip core is thereby simply fixed and held in the casing.

The edge strip is subsequently sewn, for example, between two cover parts to be connected, for example for a seat cover or a head restraint cover. For example, the free ends each have identical lengths. For example, the edge strip tab is formed by two symmetrically formed ends. Fixing stability, in particular strength, of the edge strip tab is increased here by two free ends of identical length. The free ends can be arranged uniformly, in particular uniformly deeply, between two cover parts. In particular, a very substantially precise and fixed fixing of the edge strip is simplified and an undesired slipping of the edge strip between the cover parts is avoided. Furthermore, there is an advantage in that the decorative element can be applied to the casing substantially centrally and neatly sewn thereto. Alternatively, two free ends of differing length are provided.

In one possible embodiment, the edge strip core is formed from an elastic material, in particular from plastic or rubber. This permits pleasant sitting comfort for a person sitting on the seat cover. Furthermore, the casing or cover material is formed from plastic, for example from polypropylene or vinyl, or a natural material. The casing material is in particular designed to be firmer than the material of the edge strip core. For example, the casing is provided with a lamination. For example, the casing is provided with a lamination on a non-visible side which faces the edge strip core. In particular, the lamination can be arranged as an additional material layer on the casing after production of the latter and, together with the casing, forms a top material which is to be connected, in particular sewn. The lamination is formed, for example, from plastic, such as vinyl, or from a natural material. The lamination comprises, for example, a backing fabric, for example in the form of a fabric mesh. For example, backing fabric and/or fabric mesh is arranged on a side of the lamination that faces the edge strip core. For example, the lamination is a foam lamination which supports an upper material and is arranged, in particular applied, for example, on an inner side of the casing. The lamination serves for supporting the casing and for strength of the edge strip. In particular, the edge strip is reinforced in relation to mechanical stress. In one development, the lamination comprises at least one free end, for example in the form of a tongue or a lug. The at least one free end of the lamination is arranged, for example, between the free ends of the casing. In particular, the free end of the casing has a length corresponding to the length of the respective free end of the casing. The free end of the lamination is brought together jointly with the ends, wherein the respective free ends of the lamination and of the casing are connected via the connecting seam. In particular, the respective free ends are brought together to form the edge strip tab.

The edge strip core is formed, for example, from a shaped part, in particular a plastics cord, foam cord or rubber cord. The casing is formed, for example, from a cover material, in particular from plastic, leather, a textile or a fabric.

According to a further embodiment, the decorative element is in the form of decorative stitching which extends along the longitudinal extent of the edge strip on the outer side thereof. The decorative stitching, as cross stitching, rhomboidal stitching, diamond-shaped stitching or square stitching, can be colored and/or formed in a differing thickness. For example, the decorative element is formed by a visually attractive thread, such as, for example, a thread formed from plastic or from natural material. By this means, the edge strip is visually enhanced and decorated.

Alternatively or additionally, the decorative element can be in the form of a perforation which is introduced into the casing along the longitudinal extent of the edge strip. In this case, a perforation having a multiplicity of passage holes is introduced into the material strip as the perforation in the casing. The perforation can be introduced into the material strip in the form of a pattern, in a confused manner or in predetermined intervals and/or shapes and/or sizes. The edge strip core here can be in the form of a lighting element, in particular a fiber optic cable, a lighting cord, or a light stick element. By this means, the edge strip additionally serves as a lighting element or information element.

In a further embodiment, the decorative element can be in the form of a closure tape, for example a hook and loop or binding tape, which is applied to the casing along the longitudinal extent of the edge strip. By this means, the edge strip can additionally serve as a fastening element.

The method according to the invention for producing an edge strip comprises the following steps:
applying or introducing a decorative element to or into a material strip of a casing for an edge strip core;
separately supplying the edge strip core and the material strip, which is provided with the decorative element, by means of a supply unit into an adapter unit, by means of which the edge strip core is arranged on a surface side of the material strip, said surface side forming the inner side of the casing, and the material strip is folded around the edge strip core, wherein free ends of the casing protrude from the edge strip core and are placed one above another, and
connecting the free ends along the extent of the edge strip by means of a processing unit arranged downstream of the adapter unit.

In particular, the edge strip core and the material strip provided with the decorative element are guided separately from one another into the supply unit. The material strip is subsequently folded around the edge strip core by means of the adapter unit. The material strip already folded around the edge strip core and the edge strip core are then guided into the processing unit, wherein the free ends of the material strip and of the casing that are already folded one above another are connected to one another.

The supply unit here is designed, for example, in such a manner that the edge strip core is oriented in a self-centering manner, in particular centrally, relative to the material strip for the supply and folding of the casing around the edge strip core.

The method according to the invention is distinguished by freedom of tolerances. Owing to the above-described, in particular self-centering supply of edge strip core and material strip with respect to one another, no further optimizations and/or alignments are required. Edge strip core and material strip can be supplied independently of one another because of the self-centering supply unit.

The device according to the invention for producing the previously described edge strip comprises a supply unit having at least two passages for separately supplying the edge strip core and a material strip of a casing for the edge strip core, said material strip being provided with a decorative element, into an adapter unit arranged downstream of the supply unit, and from said adapter unit into a processing unit arranged downstream of the adapter unit, wherein the supply unit is designed to arrange the edge strip core on a surface side of the material strip, said surface side forming the inner side of the casing, and the adapter unit is designed to fold the material strip about the edge strip core, wherein free ends of the casing protrude from the edge strip core and lie one above another, and wherein the processing unit sews the free ends lying one above another to one another. In particular, the supply unit is designed to supply the edge strip core and the material strip provided with the decorative element separately from one another, but at the same time into the adapter unit and from the latter into the processing unit.

According to a development, one of the passages is designed as a slot. The slot is provided to guide the casing separately from the edge strip core into the adapter unit. Furthermore, one of the passages is designed as an opening. The opening is provided to guide the edge strip core separately from the casing into the adapter unit. In particular, the opening is circular and has a diameter which corresponds to a diameter of the edge strip core. The passage designed as a slot is, for example, in arcuate form. For example, the slot is curved in the direction of the opening. The opening is spaced apart from the slot and arranged in a centered manner. As a result, the casing or the material strip can be placed, in particular folded, substantially uniformly around the edge strip core.

In a further refinement, the adapter unit is connected to the supply unit in an integrally bonded, force-fitting and/or form-fitting manner. In an optional design, the adapter unit and the supply unit are in the form of a part, for example in the form of an injection molded part.

In a possible further embodiment, the adapter unit is in the form of a folding unit and is designed to place the free ends of the casing one above another. In particular, the adapter unit comprises at least one upper guide in the region of one of the passages. The upper guide is arranged, for example, in the region of the passage designed as an opening. Furthermore, the adapter unit comprises at least one lower guide in the region of one of the passages. The lower guide is arranged, for example, in the region of the passage designed as a slot. The upper guide is tubular. The lower guide is trough-shaped or strip-shaped. For example, the lower guide is curved in the direction toward the upper guide. For example, the lower guide is in the form of a flap curved toward the upper guide, or in the form of a lug.

According to a further embodiment, the processing unit is in the form of a sewing machine and is designed to sew the free ends of the casing to one another. Alternatively, the processing unit is a different connecting machine, for example for adhesively bonding or riveting the free ends.

The supply unit here can be an integral part of a sewing machine foot or can be designed as a separate unit which can be placed on, in particular can be fastened to, the sewing machine foot. The supply unit is in particular arranged on the sewing machine foot, on the supply side thereof. The supply unit serves here for the self-centering supply of edge strip core and unfolded casing material for sewing the same in the sewing machine.

In addition, an adapter is provided which can be an integral part of a sewing machine foot and/or of the supply unit or can be placed on, in particular can be fastened to, the sewing machine foot or the supply unit. The adapter is in particular in the form of a folding unit, for example a folding funnel. The adapter, in particular the shape, size and/or structure thereof, are designed to fold the unfolded material strip with the decorative element around the edge strip core in advance as both are being supplied in the direction of the sewing machine and to supply them in the folded state to the sewing machine, in particular to the sewing machine foot, such that the free ends of the material strip form the edge strip tab, which ends are sewn to one another by means of the needle.

A seat cover according to the invention for a seat comprises a plurality of cover parts, wherein at least one edge strip produced by means of the device and the method is provided in the region of at least two cover parts which are connected to one another.

By means of introduction of the edge strip having an introduced or applied decorative element, a visually pleasing, in particular smooth or crease-free, seat cover is made possible which is produced in a simple manner.

An individual seat can be provided here by selecting a certain seat cover, in particular the material and/or edge strip thereof. In particular, differently decorative seats or a seat having different properties with seat heating and/or seat ventilation and/or interior climate zones can thereby be provided.

BRIEF DESCRIPTION OF THE DRAWINGS

Exemplary embodiments of the invention will be explained in more detail with reference to drawings, in which:

FIG. 8F shows the supply unit according to FIG. 4 and a folding unit with inserted material strip and edge strip core.

Mutually corresponding parts are provided with the same reference signs in all of the figures.

DETAILED DESCRIPTION

Figure 1:
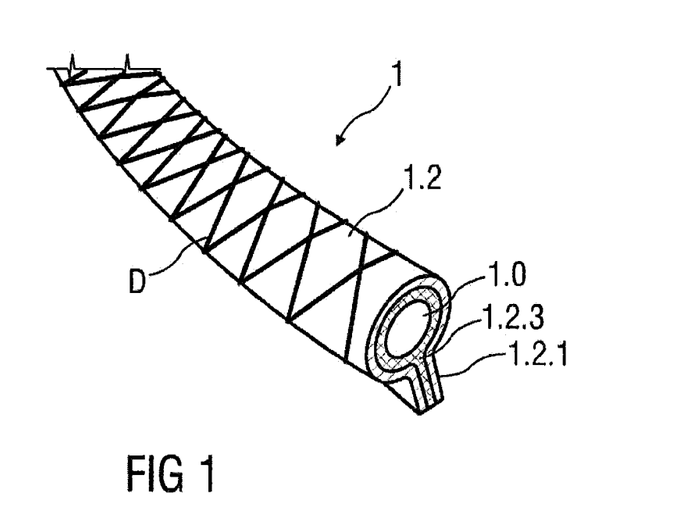
FIG. 1 shows schematically, in a perspective illustration, an edge strip having a hollow edge strip center and a decorative element.

FIG. 1 shows schematically, in a perspective illustration, an exemplary embodiment of an edge strip 1.

Edge strips 1 are used in the automobile sector. The edge strip 1 serves in general for covering, for example, visible joins between two parts, such as, for example, between two seat cover parts or parts of a trim part. The edge strip 1 is also used in the transition region of parts in order, for example, to permit a continuous transition without the interfering impression of joins.

The esthetic appearance of a component, such as that of a seat or a seat cover, is therefore improved by means of the edge strip 1.

The edge strip 1 comprises an edge strip center 1.0 and a casing 1.2 surrounding the latter, in particular a cover material. The edge strip center 1.0 is in the form of a cavity which is formed by folding of the casing 1.2.

The casing 1.2 substantially completely surrounds the edge strip center 1.0. Free ends of the casing protrude in the form of an edge strip tab 1.2.1. A decorative element D is provided on the visible outer circumference 1.2.2 of the casing 1.2.

The casing 1.2 can optionally be provided on the inner side with a lamination 1.2.3. The latter serves for supporting the casing 1.2 and for the strength of the edge strip 1 having a hollow edge strip core 1.0. Depending on the type of material of the casing 1.2, the lamination 1.2.3 can be omitted, as shown in FIG. 2B, or an edge strip core 1.1 can be arranged in the cavity, as shown by way of example in FIG. 2A.

Figure 2A:
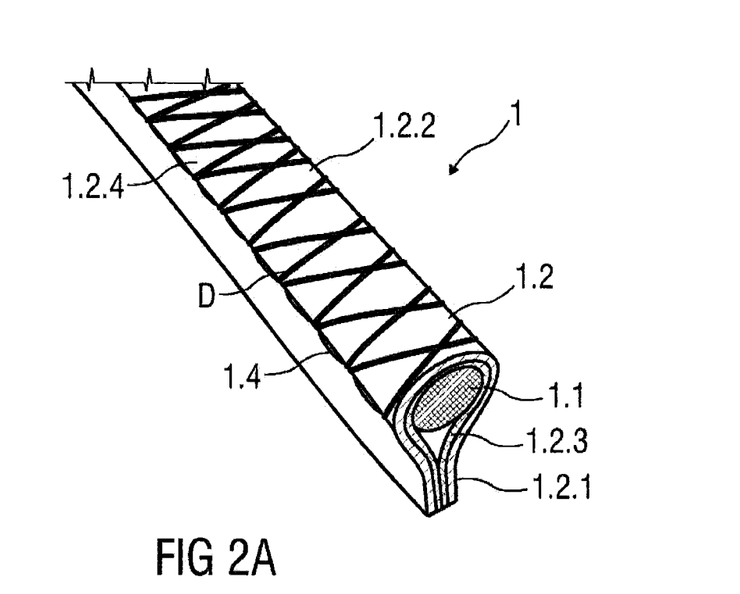
FIG. 2A shows schematically, in a perspective illustration, an edge strip having an edge strip core and a decorative element.
Figure 2B:
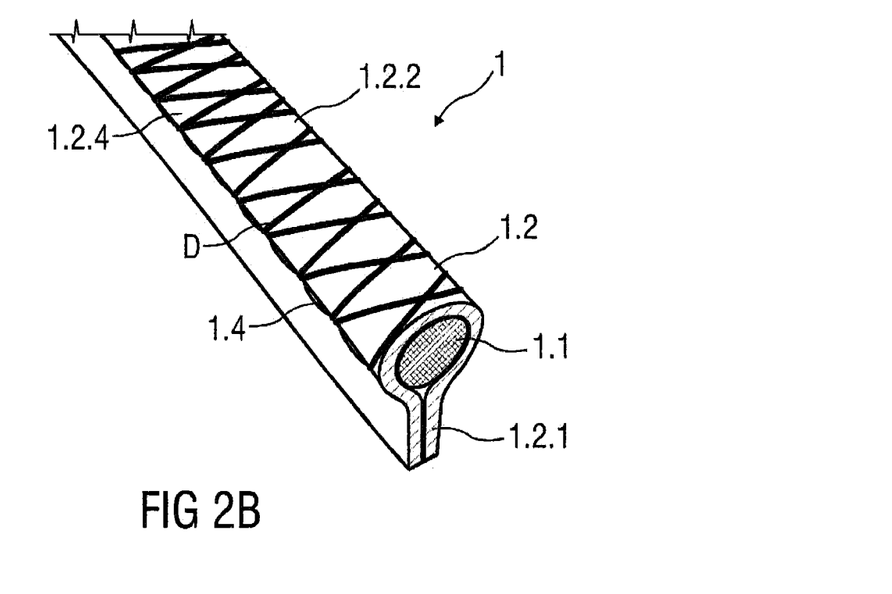
FIG. 2B shows schematically, in a perspective illustration, a further embodiment of an edge strip.

FIG. 2A shows an example of an edge strip 1 with an edge strip core 1.1 and a casing 1.2 surrounding the latter, in particular a cover material.

The casing 1.2 substantially completely surrounds the edge strip core 1.1. Free ends of the casing 1.2 protrude in the form of an edge strip tab 1.2.1.

A decorative element D is provided on the outer circumference 1.2.2 of the casing 1.2 and therefore on the outer side 1.2.4 thereof.

In the exemplary embodiment shown, the casing 1.2 surrounds or encircles the edge strip core 1.1. The edge strip core 1.1 (also called bead, center or core) is, in other words, encased or enclosed by the casing 1.2.

The free ends of the casing 1.2 protrude from the encircled edge strip core 1.1 in the form of the edge strip tab 1.2.1. The free ends of the edge strip core 1.2.1 are sewn to one another by means of a seam 1.4. In other words: the casing 1.2 encases the edge strip core 1.1, wherein the free ends thereof of the edge strip tab 1.2.1 are sewn to one another, as a result of which the edge strip core 1.1 is arranged and held within the casing 1.2. In a development, the free ends of the edge strip tab 1.2.1 are connected to one another by means of a different connecting method. For example, the free ends can be adhesively bonded and/or riveted to one another.

The edge strip 1 can subsequently be sewn, for example, between two cover parts to be connected for a seat cover or head restraint cover.

The edge strip core 1.1 and the casing 1.2 are manufactured, in particular premanufactured, separately.

The casing 1.2 is provided here with the decorative element D in a premanufacturing process.

The edge strip core 1.1 is formed, for example, from an elastic material, for example from plastic or rubber. The casing 1.2 and the edge strip tab 1.2.1 are formed integrally. In particular, the casing 1.2 and the edge strip tab 1.2.1 are formed from a material strip, for example from a cover material, in particular from a plastics material or a natural material, such as, for example, from polypropylene, artificial or real leather or from a different textile or fabric.

The casing 1.2 can optionally be provided on the inner side 1.2.5 thereof with a lamination 1.2.3.

In one possible embodiment, the edge strip core 1.1 can lie loosely in the casing 1.2. To hold and fix the edge strip core 1.1 in the casing 1.2, the free ends of the casing are sewn to one another along the longitudinal extent of the casing 1.2 by means of the seam 1.4.

The seam 1.4 is sewn together here in the region of that end of the free ends which is adjacent to the edge strip core 1.1, as is shown in FIGS. 2A and 2B.

The edge strip core 1.1 is formed, for example, from a shaped part, in particular from a plastics cord, foam cord or rubber cord. The edge strip core 1.1 is provided in particular as an endless cord.

The casing 1.2 is formed, for example, from a cover material, in particular from plastic, leather or a fabric. The cover material is provided in particular as a material strip 3, in particular an endless strip.

According to a further embodiment, the decorative element D extends along the longitudinal extent of the edge strip 1 on the visible outer side 1.2.4 thereof, in particular centered centrally, as shown in FIGS. 2A and 2B. By this means, the edge strip 1 is visually enhanced and decorated.

FIG. 2B shows schematically a further embodiment of the edge strip 1, comprising the edge strip core 1.1 and the casing 1.2 surrounding the edge strip core 1.1, without a lamination.

The casing 1.2 completely surrounds the edge strip core 1.1. The free ends of the casing 1.2 protrude in the form of an edge strip tab 1.2.1.

In the exemplary embodiment illustrated, the free ends of the casing 1.2 are of identical length. In particular, the free ends of the casing 1.2 are arranged parallel to one another in order to form the edge strip tab 1.2.1. Such an edge strip tab 1.2.1 has high stability and strength, wherein the edge strip tab 1.2.1 is arranged for arrangement between two cover elements and/or cushion elements. In one development, the free ends of the casing 1.2 can differ in length.

In a state not winding around the edge strip core 1.1, the decorative element D is applied substantially centrally to a surface side 3.1 of the material strip 3 in order to form the casing 1.2, as shown in FIGS. 3A to 3H.

FIGS. 3A to 3H in each case show schematically, in a top view, a surface side 3.1 of the material strip 3, said surface side forming a visible outer side 1.2.4 for the casing 1.2 with various exemplary embodiments for the outwardly visible, in particular centrally centered decorative element D of the edge strip 1.

Figure 3A:
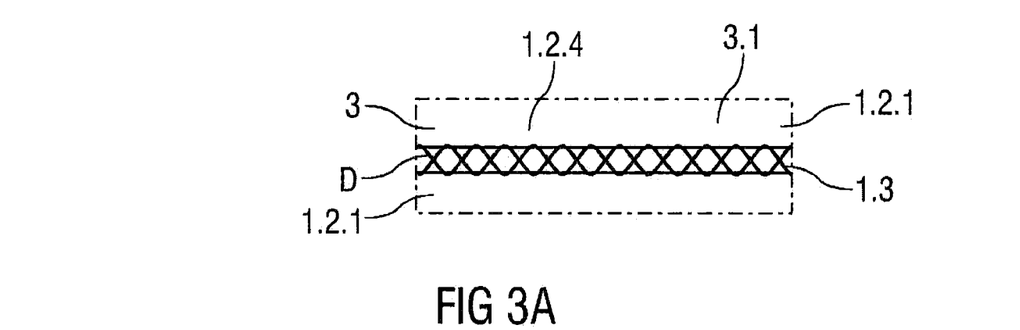
FIG. 3A shows schematically, in a top view, an outer side of a material strip for a casing having a different decorative element.

FIG. 3A shows decorative stitching 1.3 in the form of cross stitching as a decorative element D. The decorative stitching 1.3 is introduced, in particular sewn, in a centered manner on the outer side 1.2.4 of the material strip 3. In particular, the decorative element D and therefore, for example, the decorative stitching 1.3 is applied to the material strip 3 in that region which surrounds the edge strip core 1.1. The region of the material strip 3 forming the edge strip tab 1.2.1 and therefore the free ends of the casing 1.2 is free of the decorative element D, as shown in FIGS. 2A, 2B, 3A to 3G.

Figure 3B:
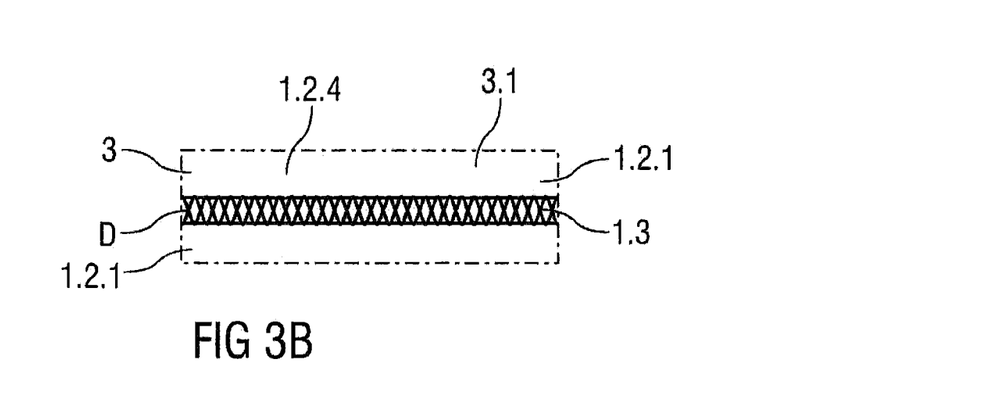
FIG. 3B shows schematically, in a top view, an outer side of a material strip for a casing having a different decorative element.

FIG. 3B shows an example of the decorative element D in the form of rhomboidal stitching forming the decorative stitching 1.3.

Figure 3C:
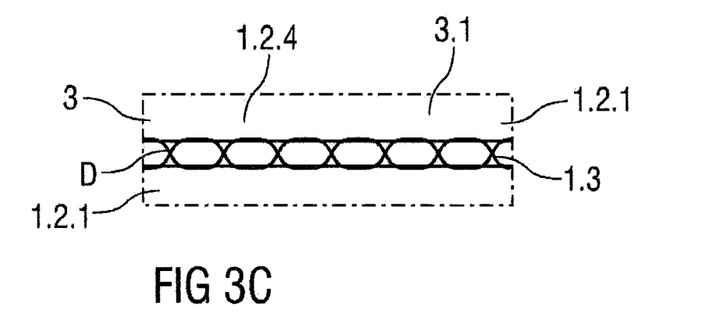
FIG. 3C shows schematically, in a top view, an outer side of a material strip for a casing having a different decorative element.

FIG. 3C shows, for example, diamond stitching as the decorative stitching 1.3.

Figure 3D:
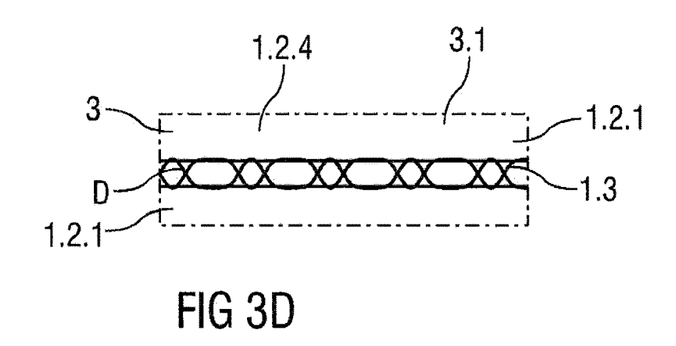
FIG. 3D shows schematically, in a top view, an outer side of a material strip for a casing having a different decorative element.

FIG. 3D shows double cross stitching as the decorative stitching 1.3.

Figure 3E:
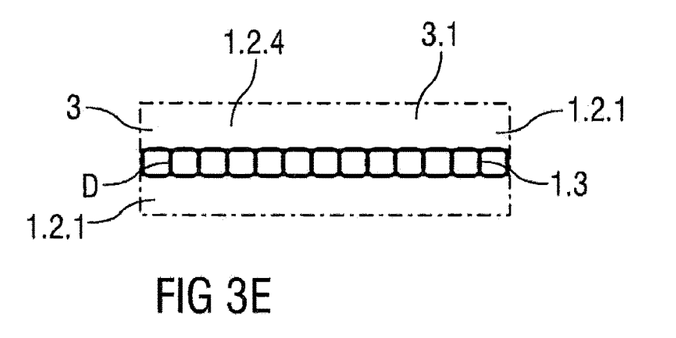
FIG. 3E shows schematically, in a top view, an outer side of a material strip for a casing having a different decorative element.

FIG. 3E shows square stitching as the decorative stitching 1.3, said square stitching being introduced into the casing 1.2 on the outer side 1.2.4 thereof.

In addition, the decorative stitching 1.3 can be colored and/or formed in a differing thickness. By means of the respective design of the decorative stitching 1.3, the edge strip 1 is visually enhanced and decorated.

Figure 3F:
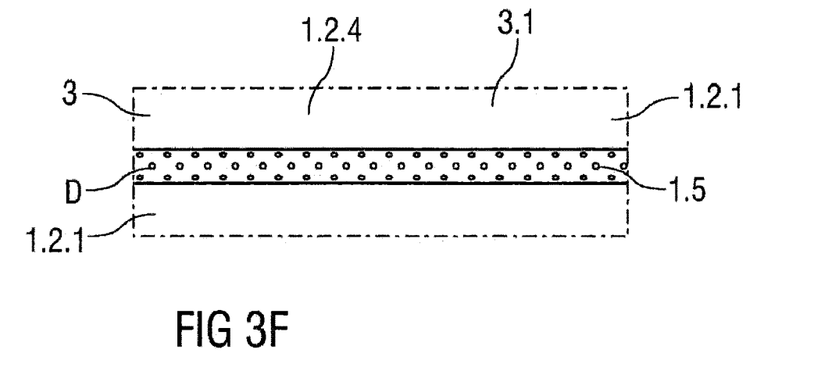
FIG. 3F shows schematically, in a top view, an outer side of a material strip for a casing having a different decorative element.

FIG. 3F shows a further exemplary embodiment of an edge strip 1 with the decorative element D which is in the form of a perforation 1.5 introduced into the casing 1.2 along the longitudinal extent of the edge strip 1. As the perforation 1.5 introduced into the casing 1.2, a perforation having a multiplicity of passage holes is introduced into the material strip 3. The perforation can be introduced into the material strip 3 in the form of a pattern, in a confused manner or in predetermined intervals and/or shapes and/or sizes. In this exemplary embodiment, the edge strip core 1.1 can be in the form of a lighting element, in particular a fiber optic cable, a light cord, or a light stick element which is surrounded by the perforated casing 1.2. The edge strip 1 is used here in a simple manner as a lighting element, wherein light from the edge strip core 1.1 that is in the form of a lighting cord or light stick is radiated through the perforation 1.5 and therefore through the perforation to the outside from the edge strip 1.

Figure 3G:
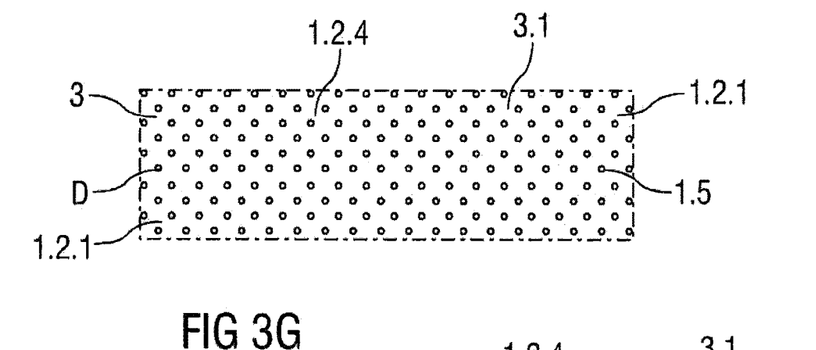
FIG. 3G shows schematically, in a top view, an outer side of a material strip for a casing having a different decorative element.

FIG. 3G shows a further embodiment in which the decorative element D is introduced into the casing 1.2 as a perforation 1.5 over the full surface area.

Figure 3H:
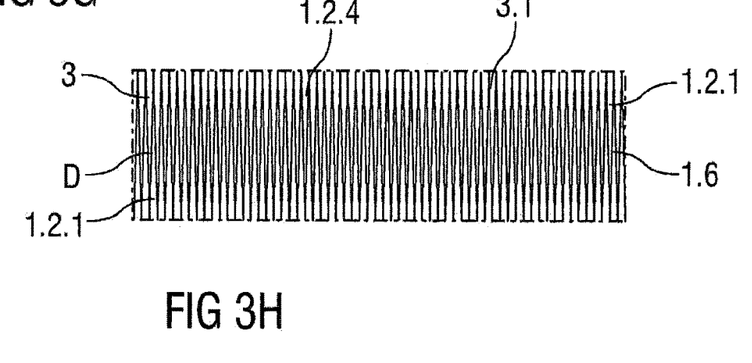
FIG. 3H shows schematically, in a top view, an outer side of a material strip for a casing having a different decorative element.

FIG. 3H shows a further embodiment in which the decorative element D is in the form of a closure tape 1.6, for example a hook and loop or adhesive tape. The closure tape 1.6 is formed over the full surface area on the outer side 1.2.4 of the casing 1.2. By this means, the edge strip 1 can additionally serve as a fastening element.

Figure 4:
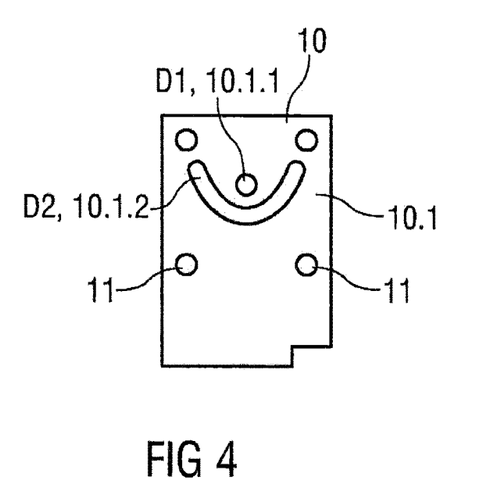
FIG. 4 shows schematically, in a perspective view, a supply unit for supplying a material strip and an edge strip core for a further processing unit, such as a folding unit and/or a sewing machine.
Figure 9:
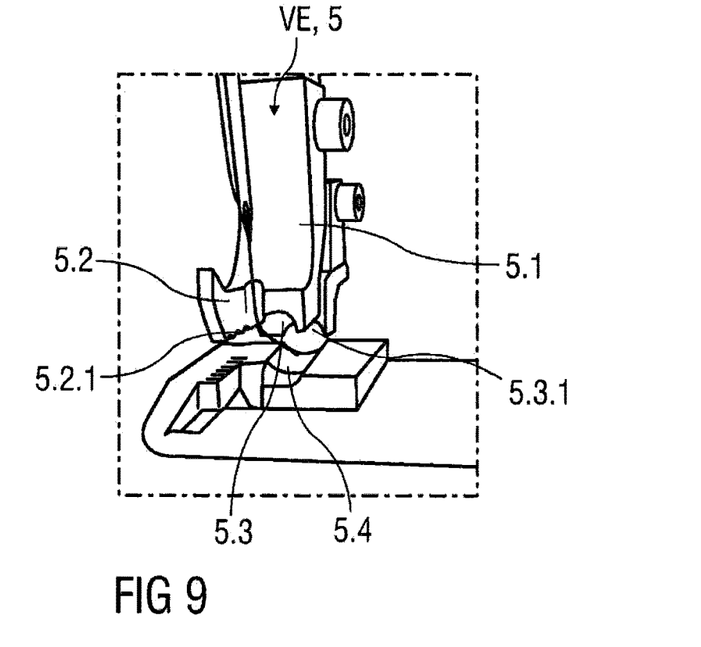
FIG. 9 shows schematically, in an enlarged illustration, an exemplary embodiment of a sewing machine foot for a sewing machine.
Figure 10:
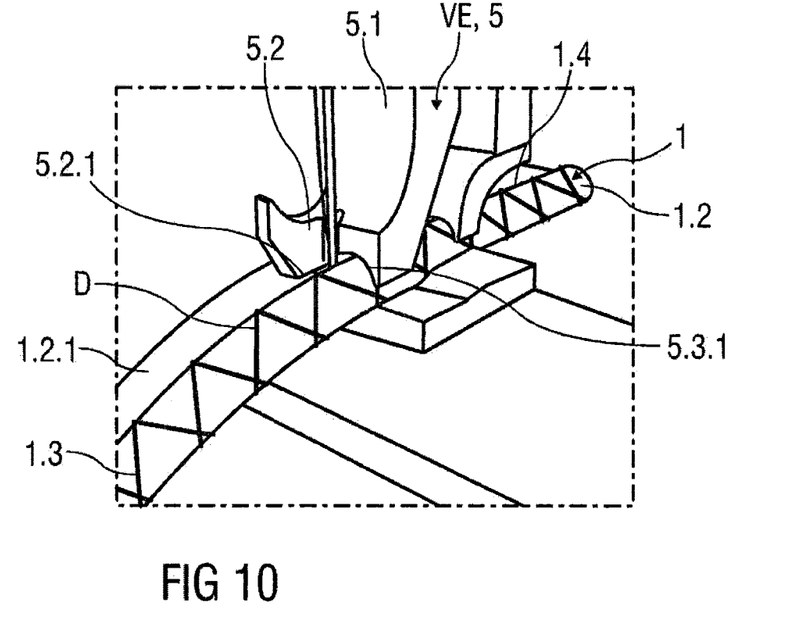
FIG. 10 shows schematically, in an enlarged illustration, an exemplary embodiment of a sewing machine foot for a sewing machine with inserted material strip and edge strip core.
Figure 11:
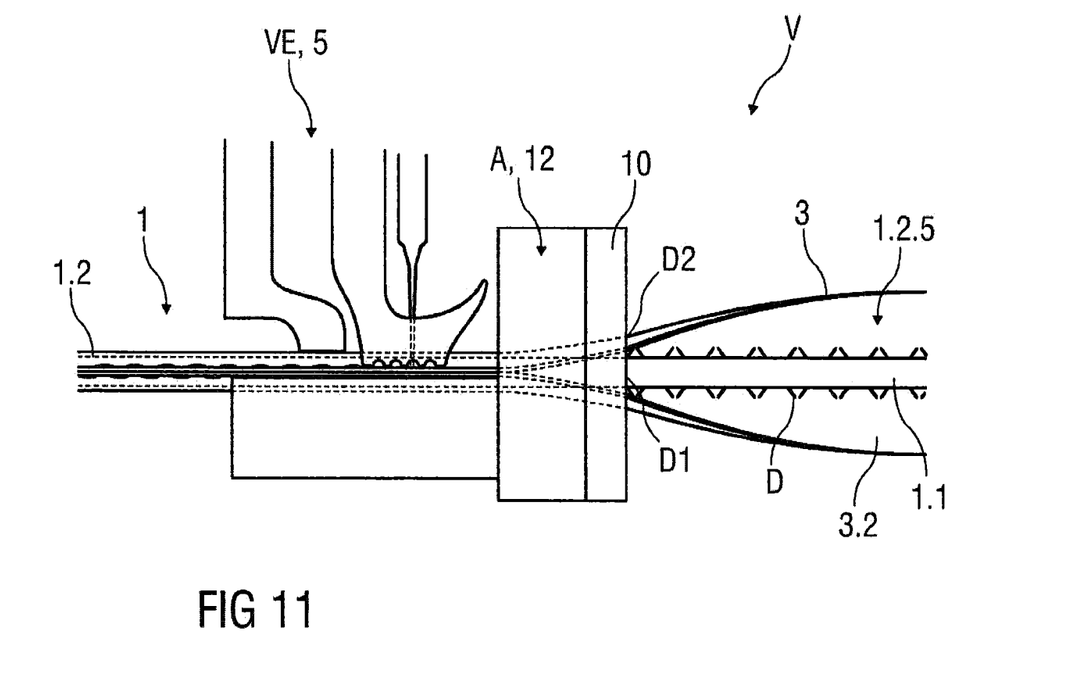
FIG. 11 shows schematically an exemplary embodiment of a device for producing the edge strip.

FIG. 4 shows schematically, in a perspective view, a supply unit 10 for supplying the material strip 3 and the edge strip core 1.1 independently of one another to a following adapter unit A, such as, for example, a folding unit 12 (shown in FIGS. 5, 6 and 11) and/or a processing unit VE, such as, for example, a sewing machine 5 (for example shown in FIGS. 9, 10 and 11). In one development, the processing unit VE can be a different connecting machine, for example for the integrally bonded, force-fitting and/or form-fitting connection of the free ends of the casing 1.2.

The supply unit 10 comprises a basic element 10.1. Furthermore, the supply unit 10 comprises at least two passages D1, D2 which are introduced into the basic element 10.1.

One of the passages D1 is designed in the form of an opening 10.1.1 for the edge strip core 1.1. The other passage D2 is designed in the form of a slot 10.1.2 for the material strip 3 for forming the casing 1.2. The circular passage D1 is arranged above the slot-shaped passage D2 and is introduced into the basic element 10.1 in a manner centered centrally relative to the slot-shaped passage D2. By means of such an arrangement and configuration of the passages D1 and D2, the edge strip core 1.1 and the material strip 3 of the casing 1.2 and therefore the casing 1.2 are aligned independently of one another but relative to one another and are supplied in a centered manner to the following adapter unit A and/or to the processing unit VE.

The invention will be described in more detail below with reference to the processing in an adapter unit A in the form of a folding unit 12 and in the processing unit VE in the form of a sewing machine 5.

The supply unit 10 comprises the basic element 10.1, in particular a plate. The opening 10.1.1, in particular a round passage opening, is introduced into the basic element 10.1. The opening 10.1.1 serves for supplying the edge strip core 1.1. The size and/or shape of the opening 10.1.1 substantially corresponds here to the outer shape and/or outer dimensions of the edge strip core 1.1, and therefore the latter can be guided through the opening 10.1.1.

The slot 10.1.2, in particular an arcuate slot, is introduced below the opening 10.1.1. The slot 10.1.2 serves for supplying the material strip 3 of the casing 1.2 into the folding unit 12. The size and/or shape of the slot 10.1.2 substantially corresponds here to the outer shape and/or outer dimensions of the material strip 3, and therefore the latter can be guided through the slot 10.1.2.

The decorative element D is applied in advance to the material strip 3.

The opening 10.1.1 is introduced into the basic element 10.1 above the slot 10.1.2 and in a manner centered centrally relative to the slot 10.1.2. By means of such an arrangement and configuration of slot 10.1.2 and opening 10.1.1, the edge strip core 1.1 and the material strip 3 of the casing 1.2 and therefore the casing 1.2 are supplied to the following folding unit 12 and/or the sewing machine 5 independently of one another, but aligned and centered relative to one another.

Figure 5:
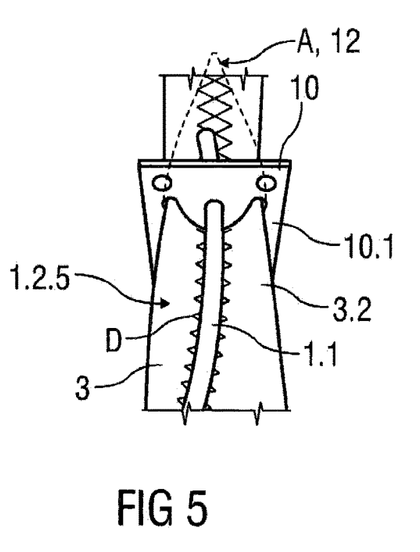
FIG. 5 shows schematically, in a perspective view from the front (supply side/entry side), the supply unit according to FIG. 4 with inserted material strip and edge strip core.
Figure 6:
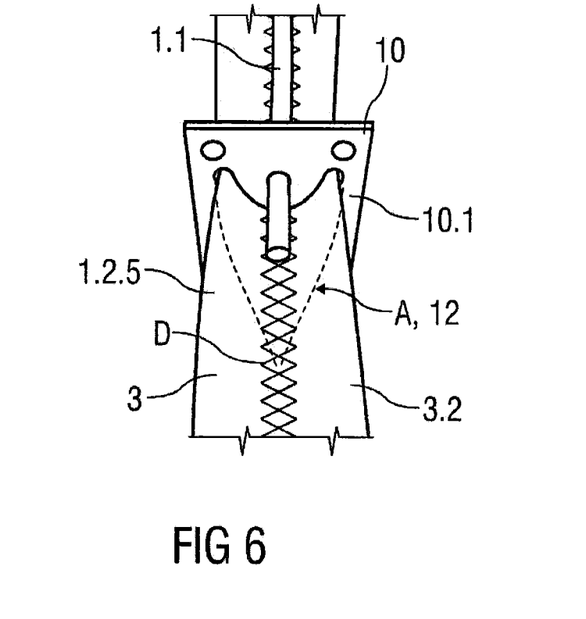
FIG. 6 shows schematically, in a perspective view from the rear (exit side), a supply unit with inserted material strip and edge strip core.

FIGS. 5 and 6 show schematically, in a perspective view, the supply unit 10 with inserted material strip 3 and edge strip core 1.1. The supply unit 10 is formed in a self-centering manner. The supply unit 10 aligns the edge strip core 1.1 relative to the material strip 3 in a self-centering manner, in particular centrally.

Figure 7:
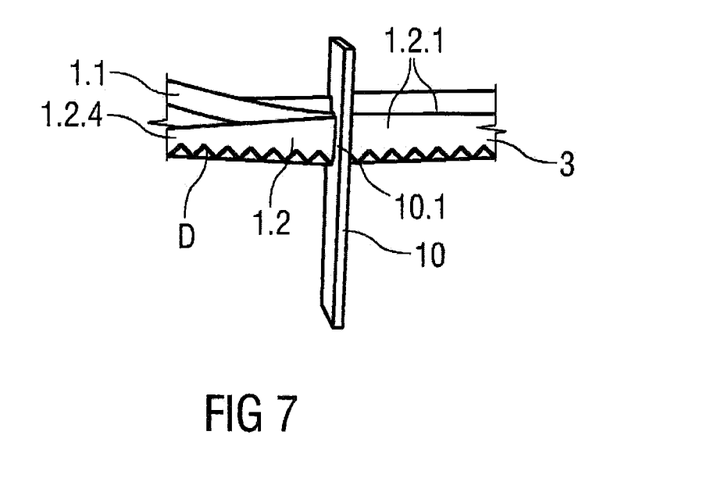
FIG. 7 shows schematically, in a perspective view in a side view, the supply unit with inserted material strip and edge strip core, wherein the material strip is folded around the edge strip core.
Figure 8A:
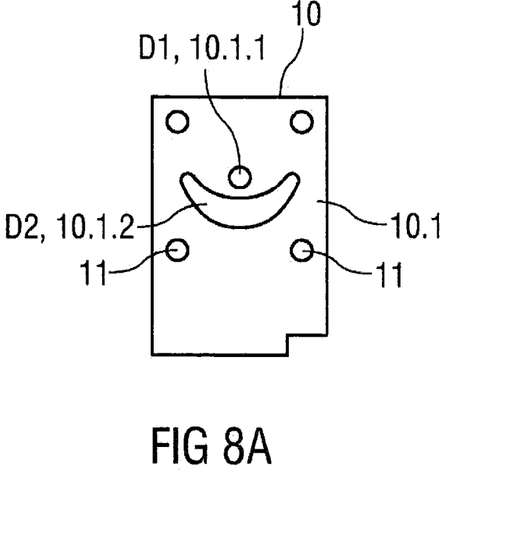
FIG. 8A shows the supply unit according to FIG. 4 and a folding unit with inserted material strip and edge strip core.
Figure 8B:
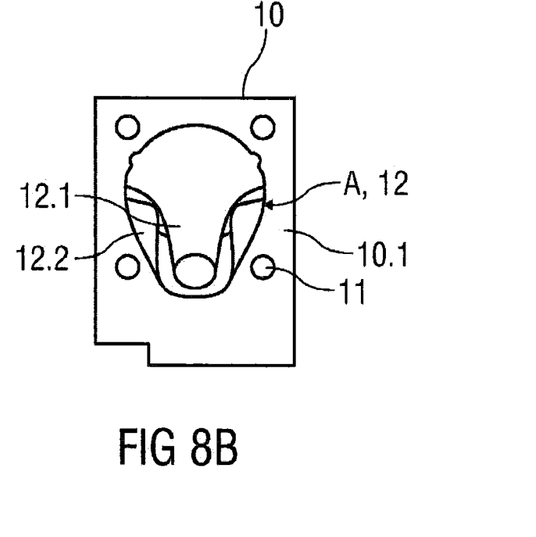
FIG. 8B shows the supply unit according to FIG. 4 and a folding unit with inserted material strip and edge strip core.
Figure 8C:
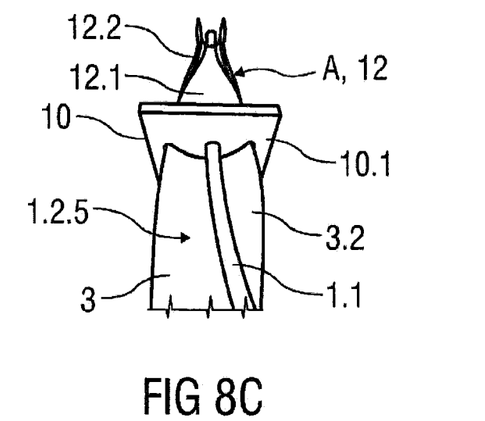
FIG. 8C shows the supply unit according to FIG. 4 and a folding unit with inserted material strip and edge strip core.
Figure 8D:
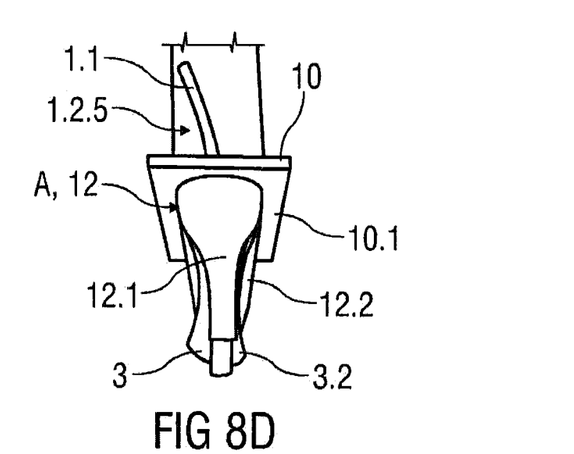
FIG. 8D shows the supply unit according to FIG. 4 and a folding unit with inserted material strip and edge strip core.
Figure 8E:
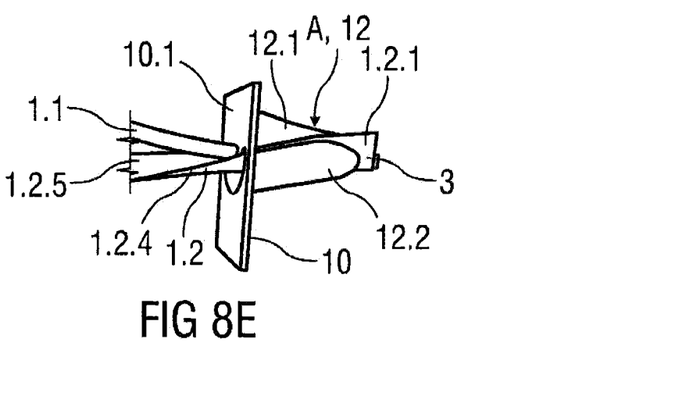
FIG. 8E shows the supply unit according to FIG. 4 and a folding unit with inserted material strip and edge strip core.

The arc shape of the slot 10.1.2 can be shaped here in such a manner that the material strip 3 is folded on the exit side of the supply unit 10.1 around the synchronously supplied edge strip core 1.1 (as shown in FIG. 7).

Alternatively or additionally, the folding unit 12 can be arranged, for example inserted or fastened, on the exit side of the supply unit 10.

The folding unit 12 is in the form, for example, of a folding funnel, the large opening of which is arranged and fastened, on the supply unit 10. The small opening is aligned and arranged facing away from the supply unit 10 on the exit side.

In order to produce the edge strip 1, the edge strip core 1.1 and the unfolded material strip 3 for the casing 1.2 of the edge strip core 1.1 are guided here into the supply unit 10 in such a manner that the edge strip core 1.1 is supplied to the folding unit 12 and/or to the sewing machine t5 on the surface side 3.2 of the material strip 3, said surface side forming the inner side 1.2.5 of the casing 1.2.

The arc shape of the slot 10.1.3 and/or the shape of the folding unit 12 then folds the material strip 3 around the edge strip core 1.1, wherein the longer free ends of the casing 1.2 lie one above another as edge strip tab 1.2.1.

In other words: by means of the arrangement of slot 10.1.2 and opening 10.1.1 of the supply unit 10 and the funnel shape of the folding unit 12 and/or arc shape of the slot 10.1.2, the supplied material strip 3, as the latter being supplied, is folded centrally around the likewise supplied edge strip core 1.1. In the process, the free ends are led out of the folding unit 12 in the form of an edge strip tab 1.2.1 at the end facing away from the supply unit 10, in particular at a narrow, for example slot-shaped, end of the funnel of the folding unit 12, and are supplied to the needle of the sewing machine 5 which sews the free ends of the edge strip tab 1.2.1 to one another.

The method according to the invention is distinguished by freedom of tolerances. Owing to the above-described, in particular self-centering supply of edge strip core 1.1 and material strip 3 to one another, no further optimizations and/or alignments are required.

The free ends of the edge strip tab 1.2.1 are subsequently sewn to one another by means of the sewing machine 5 using the seam 1.4 (as shown in FIGS. 9 and 10).

FIGS. 8A to 8E illustrate, in various views, the supply unit 10 according to FIG. 4 and a possible exemplary embodiment of a folding unit 12 with inserted material strip 3 and edge strip core 1.1.

The folding unit 12 comprises an upper funnel-shaped guide 12.1 for guiding the edge strip core 1.1 and a lower funnel-shaped guide 12.2 for guiding and deforming the material strip 3 into a desired, substantially round shape before sewing of the edge strip tabs 1.2.1. The lower funnel-shaped guide 12.2 surrounds the upper funnel-shaped guide 12.1 on the lower side thereof concentrically at least in sections.

The upper funnel-shaped guide 12.1 supplies the edge strip core 1.1 to the opening 10.1.1 of the supply unit 10 and the lower funnel-shaped guide 12.2 supplies the material strip 3 of the casing 1.2 and therefore the casing 1.2 to the opening 10.1.1 and to the slot 10.1.2 of the supply unit 10 independently of one another but aligned and centered relative to one another.

FIG. 9 shows schematically, in a perspective view, the sewing machine 5 in the region of a sewing machine foot 5.1.

The supply unit 10 and/or the folding unit 12 are/is arranged on the entry side of the sewing machine foot 5.1 in a manner not illustrated specifically. In particular, said supply unit and folding unit can be fastenable, in particular insertable or screwable, in the form of an integrated constructional unit to the sewing machine 5. For this purpose, for example, the supply unit 10 has fastening openings 11.

The sewing machine foot 5.1 is designed to guide the material strip 3, which is folded around the edge strip core 1.1, and to sew the edge strip tab 1.2.1 thereof together. For this purpose, the sewing machine foot 5.1 has a modified sledge-shaped element 5.2 which has only one runner 5.2.1.

On the side of the omitted runner, the sewing machine foot 5.1 has a slot 5.3 which has an internal curvature 5.3.1 which is formed in a manner corresponding to the contour of the edge strip core 1.1. Similarly, a fixed basic part has an internal curvature 5.4 which is likewise designed in a manner corresponding to the contour of the edge strip core 1.1.

FIG. 10 shows schematically, in an enlarged illustration, an exemplary embodiment of the sewing machine foot 5.1 of the sewing machine 5 with the material strip 3 inserted and folded around the edge strip core 1.1 in order to introduce the seam 1.4 into the edge strip tab 1.2.1.

In summary, the above-described device V, shown in FIG. 11, for producing the above-described edge strip 1 comprises the supply unit 10 for supplying the edge strip core 1.1 and an unfolded material strip 3 for the casing 1.2 of the edge strip core 1.1, optionally via the folding unit 12 and therefore indirectly, or directly, into the sewing machine 5. The supply unit 10 here is designed to supply the edge strip core 1.1 to the folding unit 12 and/or to the sewing machine 5 on a surface side 3.2 of the material strip 3, said surface side forming the inner side 1.2.5 of the casing 1.2. The supply unit 10 and/or the folding unit 12 folds the material strip 3 here around the edge strip core 1.1. Subsequently, the sewing machine 5 sews the free ends of the casing 1.2 and therefore the edge strip tab 1.2.1 to one another.

The supply unit 10 and/or the folding unit 12 can be an integral part of the sewing machine 5 or can be designed as a separate unit which can be placed on, in particular can be fastened to, the sewing machine foot 5.1. The supply unit 10 is in particular arranged on the sewing machine foot 5.1 on the supply side thereof. The supply unit 10 serves here for the self-centering supply of edge strip core 1.1 and unfolded casing material for sewing of same in the sewing machine 5.

By means of introducing the edge strip 1.1, a visually pleasing, in particular smooth or crease-free, seat cover is made possible which is produced in a simple manner.

FIG. 11 shows schematically an exemplary embodiment of a device V for producing the edge strip 1.

The device V comprises the supply unit 10 having at least two passages D1, D2 that separately supply the edge strip core 1.1 and the material strip 3 of the casing 1.2 for the edge strip core 1.1, said material strip being provided with the decorative element D. Furthermore, the device V comprises the adapter unit A arranged downstream of the supply unit 10, and the processing unit VE arranged downstream of the adapter unit A.

The supply unit 10 is designed to arrange the edge strip core 1.1 on a surface side 3.2 of the material strip 3, said surface side forming the inner side 1.2.5 of the casing 1.2.

The adapter unit A is designed to fold the material strip 3 around the edge strip core 1.1, wherein free ends of the casing 1.2 protrude from the edge strip core 1.1 and lie one above another, wherein the processing unit VE connects the free ends lying one above another to one another.

LIST OF REFERENCE SIGNS

1 Edge strip
1.0 Edge strip center
1.1 Edge strip core
1.2 Casing
1.2.1 Edge strip tabs
1.2.2 Outer circumference
1.2.3 Lamination
1.2.4 Outer side
1.2. Inner side
1.3 Decorative stitching
1.4 Seam
1.5 Perforation
1.6 Closure tape
3 Material strip
3.1, 3.2 Surface side
5 Sewing machine
5.1 Sewing machine foot
5.2 Sledge-shaped element
5.2.1 Runner
5.3 Slot
5.3.1 Internal curvature
5.4 Internal curvature
10 Supply unit
10.1 Basic element
10.1.1 Opening
10.1.2 Slot
11 Fastening openings
12 Folding unit
12.1 upper guide
12.2 lower guide
A Adapter unit
D Decorative element
D1, D2 Passage
V Device
VE Processing unit

The invention claimed is:

1. A device for producing an edge strip, comprising:
a supply unit having at least two passages for separately supplying an edge strip core and a material strip of a casing for the edge strip core, said material strip being provided with a decorative element; an adapter unit arranged downstream of the supply unit, and a processing unit arranged downstream of the adapter unit,
wherein the supply unit is designed to arrange the edge strip core on a surface side of the material strip, said surface side forming the inner side of the casing, and the adapter unit is designed to fold the material strip around the edge strip core,
wherein free ends of the casing protrude from the edge strip core and lie one above another,
wherein the processing unit connects the free ends lying one above another to one another,
wherein one of the passages is designed as a slot and is provided to guide the casing separately from the edge strip core into the adapter unit.

2. The device as claimed in claim 1, wherein one of the passages is designed as an opening and is provided to guide the edge strip core separately from the casing into the adapter unit.

3. The device as claimed in claim 1, wherein the adapter unit is connected to the supply unit in an integrally bonded, force-fitting and/or form-fitting manner.

4. The device as claimed in claim 1, wherein the adapter unit is in the form of a folding unit and is designed to place the free ends of the casing one above another.

5. The device as claimed in claim 1, wherein the adapter unit comprises at least one upper guide in the region of the passage of the supply unit.

6. The device as claimed in claim 1, wherein the adapter unit comprises at least one lower guide in the region of the passage.

7. The device as claimed in claim 1, wherein the processing unit is in the form of a sewing machine and is designed to sew the free ends of the casing to one another.

* * * * *